US010775192B2

(12) United States Patent
MacGougan et al.

(10) Patent No.: US 10,775,192 B2
(45) Date of Patent: Sep. 15, 2020

(54) METHOD AND APPARATUS FOR PROVIDING DYNAMIC WARNINGS FOR NAVIGATIONS

(71) Applicant: Apple Inc., Cupertino, CA (US)

(72) Inventors: Glenn D. MacGougan, San Jose, CA (US); Laurent Charignon, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/870,268

(22) Filed: Jan. 12, 2018

(65) Prior Publication Data

US 2018/0209812 A1 Jul. 26, 2018

Related U.S. Application Data

(63) Continuation of application No. 14/503,393, filed on Sep. 30, 2014, now Pat. No. 9,869,564.

(51) Int. Cl.
*G01C 21/36* (2006.01)

(52) U.S. Cl.
CPC ................ *G01C 21/3697* (2013.01)

(58) Field of Classification Search
None
See application file for complete search history.

(56) References Cited

U.S. PATENT DOCUMENTS

| | | | |
|---|---|---|---|
| 5,612,882 A * | 3/1997 | LeFebvre | G01C 21/3453 340/990 |
| 6,424,904 B1 | 7/2002 | Takahashi et al. | |
| 6,662,106 B2 | 12/2003 | Evans | |
| 7,437,241 B2 | 10/2008 | Jung et al. | |
| 7,486,201 B2 | 2/2009 | Kelly et al. | |
| 7,983,840 B2 | 7/2011 | Pair et al. | |
| 8,188,887 B2 | 5/2012 | Catten et al. | |
| 8,370,755 B2 | 2/2013 | Buecker et al. | |

(Continued)

FOREIGN PATENT DOCUMENTS

GB 2028546 A 3/1980

OTHER PUBLICATIONS

Fernandes, Leandro C., et al., "A Driving Assistance System for Navigation in Urban Environments," Month Unknown, 2010, 10 pages, Springer-Verlag, Berlin Heidelberg, DE.

(Continued)

*Primary Examiner* — John Olszewski
*Assistant Examiner* — Gerrad A Foster
(74) *Attorney, Agent, or Firm* — Invoke

(57) ABSTRACT

A navigation application that provides a dynamic set of warnings based on a set of collected and calculated data. The navigation application collects a series of data and identifies a set of critical points along the route. The navigation application analyzes the collected data to determine whether to provide a navigation warning to the user. The navigation application uses the collected data to determine whether a navigation instruction for the critical point should be modified to account for different driving conditions. Finally, the navigation application of some embodiments determines a timing for when a navigation instruction should be provided to the user, ensuring that the instruction is presented to the user with sufficient time to safely adjust their behavior.

30 Claims, 9 Drawing Sheets

(56) References Cited

U.S. PATENT DOCUMENTS

| | | | |
|---|---|---|---|
| 8,554,468 B1* | 10/2013 | Bullock | G01S 19/14 340/438 |
| 2004/0199326 A1* | 10/2004 | Jung | B60K 31/0058 701/431 |
| 2005/0216185 A1 | 9/2005 | Takezaki et al. | |
| 2007/0159355 A1* | 7/2007 | Kelly | G01C 21/3694 340/905 |
| 2009/0312945 A1 | 12/2009 | Sakamoto et al. | |
| 2012/0143493 A1 | 6/2012 | Tang | |
| 2012/0296539 A1 | 11/2012 | Cooprider et al. | |
| 2013/0113615 A1 | 5/2013 | Jin et al. | |
| 2013/0151145 A1* | 6/2013 | Ishikawa | G01C 21/3667 701/428 |
| 2013/0162425 A1 | 6/2013 | Raghunathan et al. | |
| 2013/0215274 A1 | 8/2013 | Son et al. | |
| 2013/0271293 A1* | 10/2013 | Jerusalem | B60Q 9/00 340/905 |
| 2013/0338914 A1 | 12/2013 | Weiss | |

OTHER PUBLICATIONS

Anastasi, Giuseppe, et al., "Energy conservation in wireless sensor networks: A Survey," Jul. 29, 2008, 32 pages, Elsevier.

\* cited by examiner

METHOD AND APPARATUS FOR PROVIDING DYNAMIC WARNINGS FOR NAVIGATIONS

CROSS-REFERENCE TO RELATED APPLICATION

This is a continuation of U.S. patent application Ser. No. 14/503,303 filed Sep. 30, 2014, which is incorporated by reference herein in its entirety.

BACKGROUND

Mapping and navigation applications allow users to browse maps and get navigation instructions for different routes. Some navigation applications provide warnings for users of the application while navigating a route. Despite their popularity, the mapping and navigation applications and the warnings that they provide have shortcomings that cause inconvenience to the users.

BRIEF SUMMARY

The invention of some embodiments provides a navigation application that presents a dynamic set of warnings. The navigation application collects a series of data and identifies a set of critical points along the route. The critical points of some embodiments are dangerous areas of the route based on the collected data. The navigation application of some embodiments analyzes the collected data to determine whether to provide a navigation warning to the user. For example, in some embodiments, the navigation application analyzes the collected data to determine a safe traveling speed for a particular critical point and determines whether to provide a navigation warning to the user based on the user's current traveling speed.

In some embodiments, the navigation application uses the collected data to determine whether a navigation instruction for the critical point should be modified to account for different driving conditions. For example, in some embodiments the navigation application determines that a navigation instruction should be modified when the road conditions are particularly poor. The navigation application of some embodiments also determines a timing for when a navigation instruction should be provided to the user based on the collected data to ensure that the instruction is presented to the user with sufficient time to safely adjust their behavior.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention may be practiced without some of the specific details and examples discussed.

In order to provide better navigation instructions for a user of a navigation application, the navigation application of some embodiments provides dynamic navigation instructions. The dynamic navigation instructions take various factors into account to enable a user to safely maneuver through potentially dangerous areas without overwhelming the user with unnecessary navigation instructions.

The navigation application of some embodiments provides a dynamic set of warnings. The navigation application collects a series of data and identifies a set of critical points along the route. The critical points of some embodiments are dangerous areas of the route based on the collected data. The navigation application of some embodiments analyzes the collected data to determine whether to provide a navigation warning to the user. In some embodiments, the navigation application uses the collected data to determine whether a navigation instruction for the critical point should be modified to account for different driving conditions. The navigation application of some embodiments determines a timing for when a navigation instruction should be provided to the user, ensuring that the instruction is presented to the user with sufficient time to safely adjust their behavior.

Figure 1:
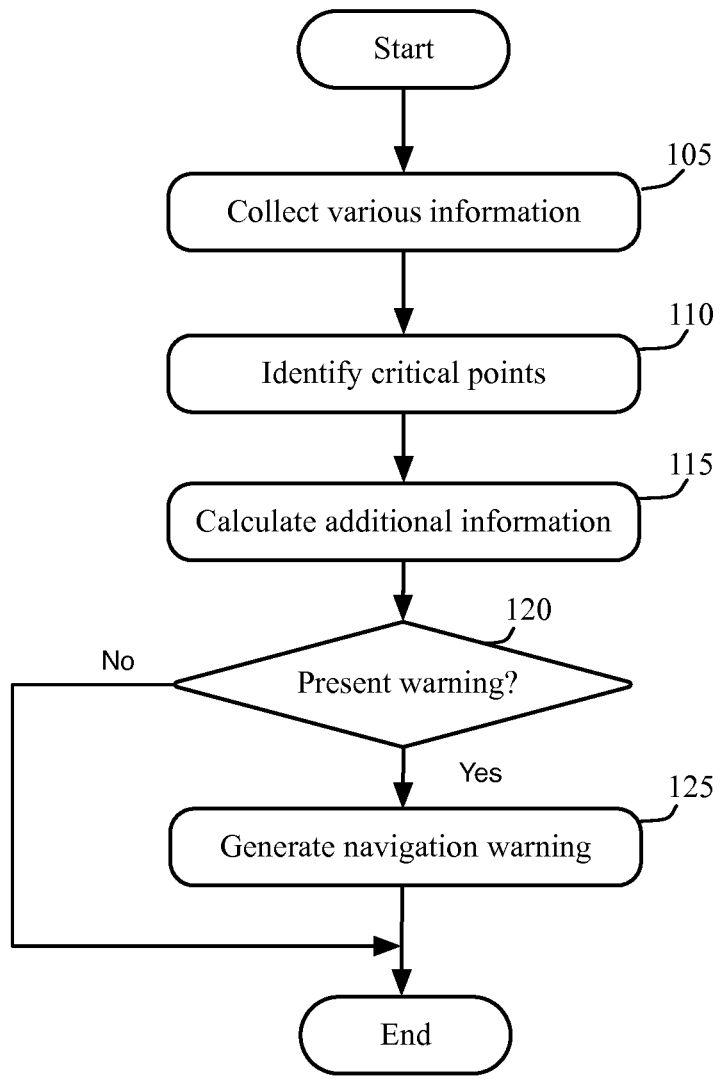
FIG. 1 conceptually illustrates a process for providing dynamic navigation warnings.

FIG. 1 conceptually illustrates a process for providing dynamic navigation instructions along a route. In some embodiments, the process 100 of FIG. 1 is performed by a dynamic warning system as described below in FIG. 3. The process 100 may be performed at specified intervals, continuously, or may be performed each time new navigation instructions are received by the navigation application.

The process 100 collects (at 105) various information, such as route and hazard data, external conditions (i.e., as weather, road conditions, etc.) as well as internal vehicle conditions (i.e., speed, tire condition, brake condition, etc.). The process 100 then uses the received information to identify (at 110) a set of critical points along the route. The critical points may include hazardous curves, road hazards (e.g., potholes, construction, etc.), or other points along the route that may require additional attention. The critical points may be identified based on road vector data, accident data, road hazard data, etc.

The process 100 then calculates (at 115) additional information in order to generate the dynamic navigation warnings. The additional information in some embodiments includes data that can be used in determining what type of navigation warning to generate (e.g., safe stopping distance, visibility, etc.).

The process 100 determines (at 120) whether to present a navigation warning based on the collected data and the calculated information. When the process 100 determines that a navigation warning is necessary, the process 100 generates (at 125) a navigation warning for the critical point based on the various collected and calculated information to provide safe warnings for the user. Generating the warning in some embodiments includes determining whether to provide a warning at all, modifying a warning based on driving conditions, determining what type of warning to provide, and determining when to provide the warning to the user.

In some embodiments, the timing, instruction, and method of providing of a navigation warning may all be modified based on the collected and calculated information. For example, when a user is traveling in snowy and dark conditions, an audio warning may be provided earlier to caution the user to drive slower, than when the user is traveling in sunny and dry conditions.

When the process 100 determines (at 120) not to present a warning, the process 100 ends. Although generating a new navigation warning for a critical point was described, in some embodiments generating a navigation warning includes modifying existing warnings based on the collected information.

The steps of process 100 may not always be performed in the same order. For example, although data collection is described in a single step (step 105 of FIG. 1), the data collection of some embodiments may instead take place at various different points during the process, or may be continually updated as the process is performed. In some embodiments, different types of data is collected at different points during the process (e.g., route data is collected to identify critical points, while weather information may not be collected until the navigation instructions are generated), or the same data may be collected and refreshed multiple times during the process.

Figure 2:
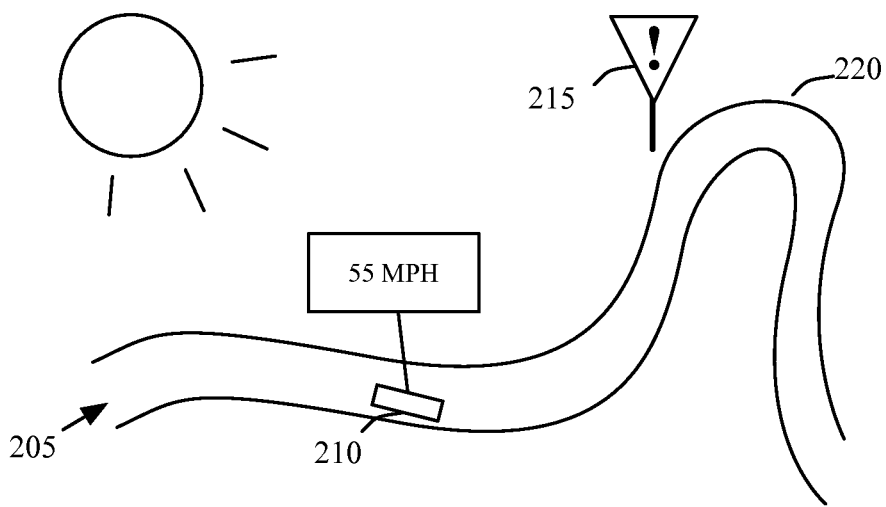
FIG. 2 illustrates an example of a scenario in which a dynamic navigation warning is provided to a user.
Figure 2:
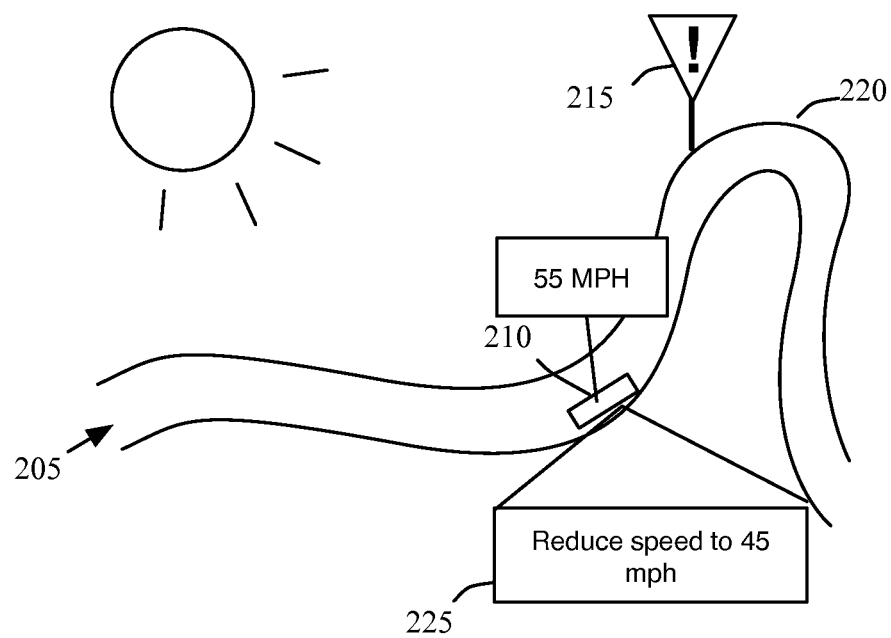

Having described an example process, an example of providing a dynamic navigation warning will now be described by reference to FIG. 2. FIG. 2 illustrates an example of a scenario in which a dynamic navigation warning is provided to a user of a navigation application. The first stage 201 illustrates a road 205 with a curve 220, a vehicle 210, and a warning sign 215.

In the first stage 201, the vehicle 210 is traveling along the road 205. The user is running a navigation application on a mobile device (e.g., a smartphone, GPS system, etc.) to get navigation instructions for a particular route. The vehicle 210 is approaching the curve 220. The navigation application of some embodiments collects data, such as weather, vehicle, and road conditions, as well as route data to then identify the curve 220 (or the warning sign 215) as an upcoming critical point. In this example, the speed of the vehicle is 55, which is a safe traveling speed based on the current conditions. The navigation application of some embodiments also calculates additional condition factors, such as a safe stopping distance, visibility, etc.

In the second stage 202, the vehicle 210 has progressed along the road 205 and is closer to the curve 220. The second stage 202 further shows that the user is presented with a dynamic navigation warning 225. The navigation warning 225 may be dynamic for a variety of reasons. In some embodiments, whether the navigation warning is presented at all is dynamic, based on various environmental and vehicle conditions. In some embodiments, the instruction, or the timing, or the method of presenting the navigation warning is dynamic, changing based on the various environmental or vehicle conditions. As examples, a warning may only be presented in certain road conditions, or may be presented earlier when it is snowing, or may be presented as an audio instruction when road visibility is low. In this example, the navigation application provides a warning 225 to reduce the user's speed to 45 mph for the upcoming curve 220.

Figure 3:
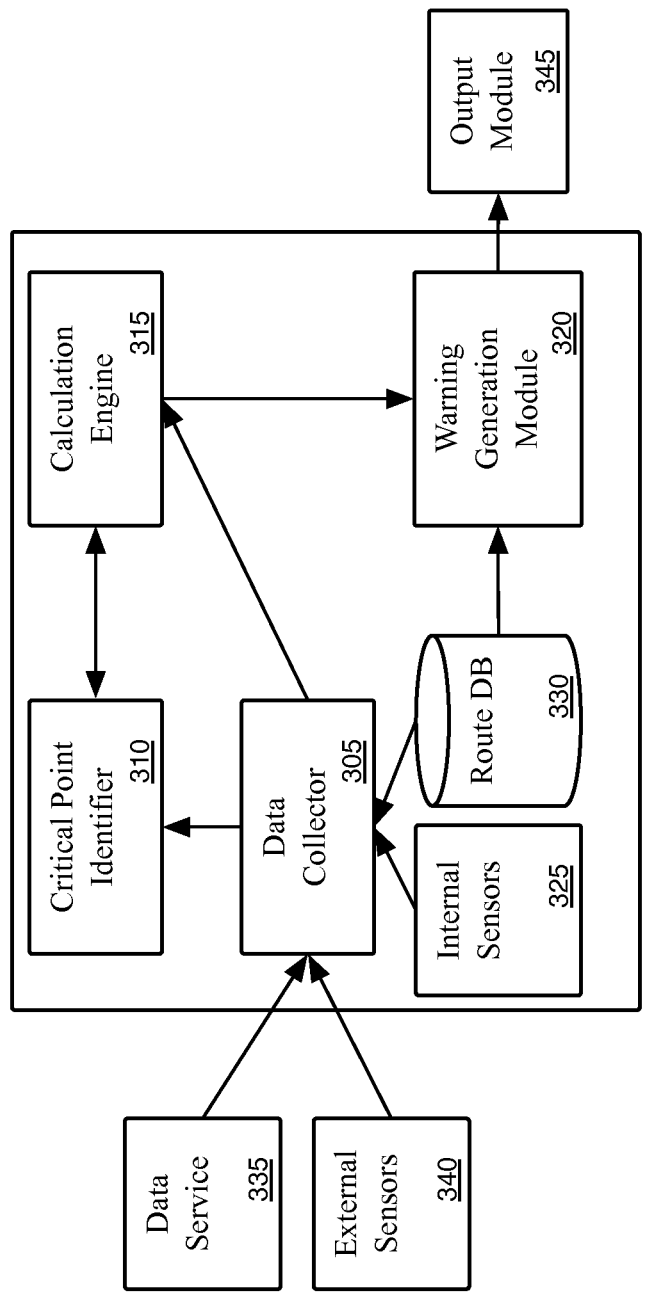
FIG. 3 conceptually illustrates an example of a dynamic warning system.

FIG. 3 illustrates an example of a dynamic warning system 300 that generates dynamic warnings during navigation. The dynamic warning system 300 of some embodiments runs as an application on a mobile device, such as a GPS navigation device, a mobile phone, etc. Although the invention is described as a part of a navigation application, some embodiments provide warnings outside of a navigation application. In some embodiments, the warnings are provided by a background application that is able to provide navigation warnings to a user, even when the user is not receiving navigation instructions.

The dynamic warning system 300 includes a data collector 305, a critical point identifier 310, a calculation engine 315, and a warning generation module 320. The dynamic warning system 300 receives inputs from data service 335 and external sensors 340 and outputs the generated dynamic warnings to the output module 345. In some embodiments, the output is presented on a display screen of the device or as an audio instruction through speakers of the device.

In some embodiments, the dynamic warning system 300 periodically performs automated processes that determine whether to provide and/or modify navigation warnings for a route that is being navigated by a user. In some embodiments, the processes run periodically or continuously in the background of the application, only providing and/or modifying navigation warnings when the dynamic warning system 300 determines that the navigation warnings are necessary.

The data collector 305 of the dynamic warning system 300 collects data from various information sources. The various information sources may be internal or external to the device on which the dynamic warning system 300 is executed. In the example of this figure, data service 335 and external sensors 340 are external information sources accessed by the data collector 305. The data service 335 includes multiple data services that may be accessed by the data collector 305 through a network (such as the Internet) or other communication channels. The data service 335 provides multiple information services such as weather, traffic, navigation, etc. The data service 335 of some embodiments also includes data that is obtained or collected from other users of the system. The external sensors 340 of some embodiments include sensors of a vehicle used for navigating a route. Such external sensors 340 are used in some embodiments to detect environmental or vehicle conditions, such as road conditions, brake conditions, etc.

In addition to the external information sources, the data collector 305 also accesses various internal information sources, such as internal sensors 325 and route database 330. The internal sensors 325 of some embodiments include sensors located within the device, such as GPS, an accelerometer, a gyroscope, WiFi sensors, etc. The internal sensors may be used in the place of the external sensors 340, or to supplement the data received from external sensors 340 to detect the environmental and/or vehicle conditions.

The route database 330 stores information about the route. The information stored in the route database 330 of some embodiments includes road hazard information, road vector data, accident statistics, etc. Although the route database is shown as a local database in the dynamic warning system, it should be understood that the route database 330 may be an external database (e.g., located in the vehicle's computer system, accessed through a data service 335, third party vendors, etc.). Although FIG. 3 illustrates an example with several different data sources, in some embodiments, data is not collected from all of the illustrated data sources and may be collected from additional data sources not shown in this figure.

The critical point identifier 310 receives data collected by the data collector 305 and uses the data to identify upcoming critical points along the route. The critical points may be determined based on road vector data, accident data, road hazard data, etc. The critical points may include hazardous curves, road hazards (e.g., potholes, construction, etc.), or other points along the route that may require additional attention. The critical point identifier 310 may also identify a critical point based on visibility of a hazard or of signage near a particular turn or road feature.

In some embodiments, the critical point identifier 310 uses the calculation engine 315 to identify additional critical points. For example, in some embodiments, the critical point identifier 310 uses the calculation engine 315 to calculate a risk factor for a particular curve based on historic accident data or based on the angle of the curve calculated based on road vector data.

The calculation engine 315 receives the critical points from the critical point identifier 310, and uses data from the data collector 305 to perform various calculations necessary to generate dynamic warnings for the received critical points. The calculations are based on data from several of the information sources. For example, in some embodiments, the calculation engine 315 calculates a safe stopping factor based on tire and brake conditions of the vehicle received from external sensors 340, weather information received from data service 335, and road conditions received from route database 330. The safe stopping factor can then be used in some embodiments to identify a safe traveling speed or an amount of time necessary to reach a safe traveling speed for a particular critical point.

The warning generation module 320 uses the calculated and collected information to generate dynamic warnings to present to the user. The warning generation module 320 determines (i) whether it is necessary to provide a warning to the user, (ii) what type of warning to provide to the user, (iii) how to modify the instruction for the user, and (iv) when to provide the warning to the user based on the collected and calculated information. Some example operations of the warning generation module 320 will be described below by reference to FIGS. 4-7.

Once the warning generation module 320 has generated dynamic warnings for the user, it supplies the navigation warning to the output module 345. The output module 345 then presents the warning to the user (e.g., on a display screen of the device or as an audio instruction through speakers of the device). The provision of dynamic navigation warnings was described generally above. Additional details for the different parts of the process will be described in the sections below.

Section I describes the data collection process, which includes gathering data from the various data sources, identifying the critical points, and calculating additional data based on the collected data and the critical points. Section II, then describes the identification of critical points and the calculation of additional condition factors for dynamic navigation warnings. Next Section III describes the generation of dynamic warnings for navigation. Finally, Section IV describes an example of an electronic device and system used to implement the processes of the invention.

I. Data Collection

In order to provide dynamic navigation instructions, the navigation application collects and calculates various sets of data. The various sets of data are used at several different points of the process and are collected from various sources through various methods. The navigation application collects several different types of information, including route information, vehicle information, and environmental information.

Route information may be collected from various sources (e.g., from a local database or from a navigation service over the Internet, etc.). The route information of some embodiments includes road vector information, accident data, road hazard data, traffic data, etc. The collected route information is used in some embodiments to identify critical points along a route. For example, in some embodiments the navigation application identifies road hazards (e.g., potholes, accidents, etc.) from a road hazard database as critical points. The navigation application of some embodiments also performs further calculations or analysis on the information to identify the critical points. For example, the navigation application of some embodiments identifies a road feature (e.g., a sharp curve, steep incline, etc.), as a critical point based on a high accident rate at that particular location.

As with the route information, the vehicle information is collected from multiple sources. The navigation application of some embodiments collects the data directly from the vehicle, such as through vehicle sensors or an API that communicates with the vehicle computer. In some embodiments, the navigation application collects vehicle data from other sources, such as through user input (e.g., the user inputs the year, make, and model of the vehicle), or through sensors on a mobile device executing the navigation application (e.g., detecting the vehicle speed through a GPS module on the mobile device). The vehicle information of some embodiments includes car condition (e.g., tire age, brake conditions, etc.), speed, acceleration profiles, etc. The collected vehicle information is used to calculate different factors that are useful in generating dynamic warnings. For example, in some embodiments, the car conditions and the weather are used to determine a braking variable that measures the ability of the vehicle to slow down or stop in the current conditions.

The environmental information describes the conditions of the environment around the vehicle. The environmental data of some embodiments includes weather conditions, ambient light detection, etc. The environmental data can be collected from various data sources of the navigation application. For example, in some embodiments, wet road conditions may be detected by sensors on the vehicle and also collected from an external data source, such as an Internet weather service. The data is then used to further customize the navigation warnings for the current road and weather conditions.

II. Critical Points and Condition Factors

The navigation application uses the various collected sets of data to identify critical points along the route and to calculate additional condition factors that may affect the nature of a dynamic navigation warning for a particular critical point. The navigation application identifies critical points along a route that may require additional attention. The critical points of some embodiments include hazardous road features (e.g., sharp curves, steep inclines, etc.) and road hazards (e.g., potholes, construction, etc.).

In some embodiments, rather than identifying a particular road feature as a critical point, the navigation application of some embodiments identifies a critical point based on visibility of a hazard or of signage near the particular road feature. For example, data collected by the navigation application may reveal that signage for a particular sharp curve is not visible until the vehicle is within 150 m of the curve. In some embodiments, rather than the curve itself, the navigation application would identify the visibility point of the signage (i.e., 150 m before the curve) as the critical point. Based on the visibility point, the navigation application of some embodiments determines a safe traveling speed for approaching the curve that allows a driver to react to the signage and reach a safe traveling speed for the curve itself.

In addition to identifying critical points based on the various data sources, the navigation application of some embodiments identifies critical points using calculations based on road vector data, historic accident data, etc. For example, in some embodiments, the navigation application analyzes historic accident data to identify locations along the route with a high accident rate.

In addition to performing calculations to identify critical points, the navigation application performs calculations to identify additional information, or condition factors, based on the collected information and the identified critical points in order to provide the dynamic navigation warnings. In some embodiments, the navigation application calculates condition factors such as a safe traveling speed, an amount of time to reach the safe traveling speed for a critical point, a stopping distance for the vehicle, etc. For example, in some embodiments, a safe traveling speed for a particular curve is calculated for the vehicle based on the tire and brake conditions, as well as weather conditions. The time to reach the safe traveling speed may be based on the calculated safe traveling speed as well as the distance to the critical point. These calculated values are then used to provide dynamic navigation warnings by, for example, modifying the timing or the instruction for a navigation warning based on the safe traveling speed.

In some embodiments, the calculations are based on a set of lookup tables that provides weightings or adjustment values for different conditions. For example, in some embodiments, when the navigation application determines that it is raining, the navigation application accesses a weather lookup table to identify an adjustment value for snowy weather. The navigation application uses the adjustment value, or a set of adjustment values, to determine the different condition factors such as a safe traveling speed or a stopping distance. For example, if the adjustment value for snowy weather is 0.8, and the normal safe traveling speed for a particular curve is 45 mph, the navigation application may determine that the safe speed for the curve during snowy weather is 36 mph. In some embodiments, the speeds are rounded to the nearest multiple of 5 (i.e., 36 mph would be rounded to 35 mph).

The navigation application of some embodiments uses more involved calculations to determine the different condition factors. In some embodiments, rather than simply performing a lookup for the current weather conditions, the navigation application collects additional weather information, such as previous weather conditions to calculate the condition factors. For example, the navigation application of some embodiments accounts for how long it has been raining, or when it detects freezing temperatures, determines whether it has rained recently to determine a likelihood for black ice or other dangerous road conditions.

III. Providing Dynamic Warnings

Figure 4:
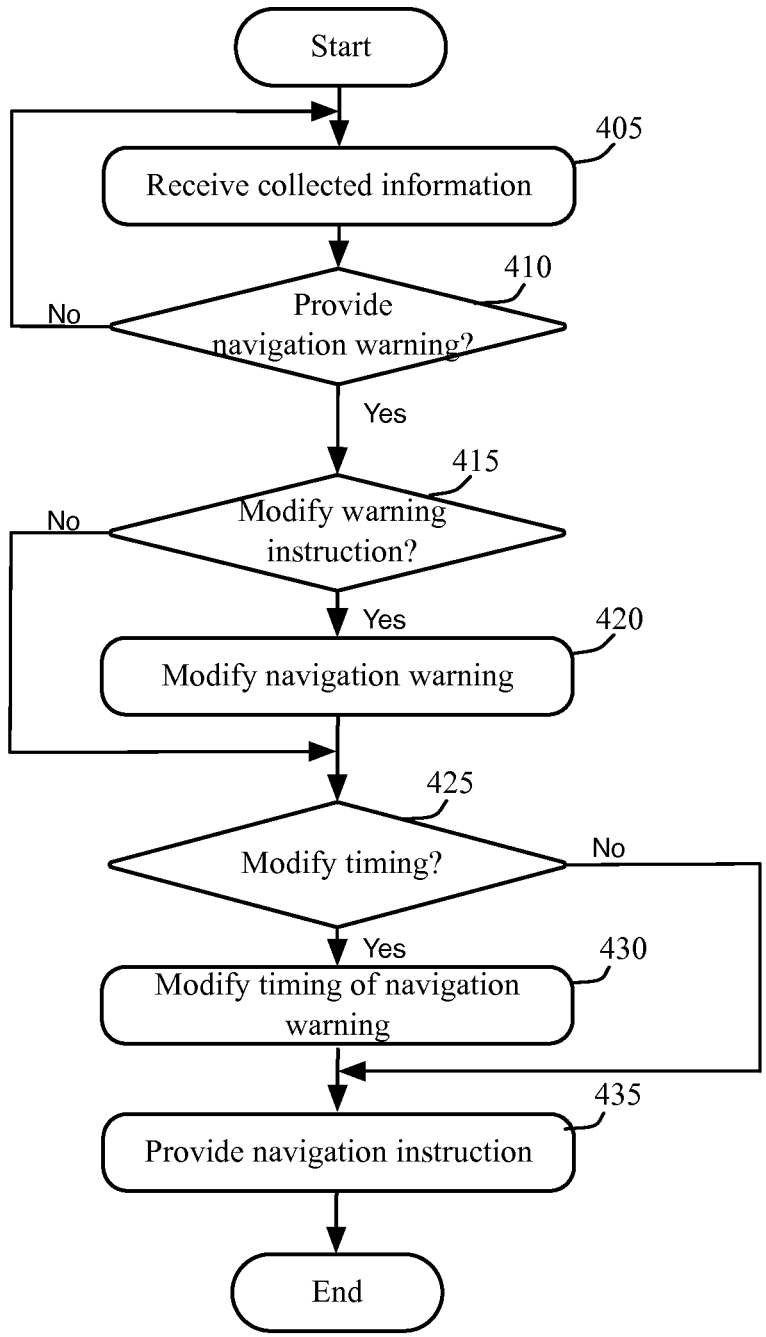
FIG. 4 conceptually illustrates a process for generating dynamic navigation warnings.

Based on the collected data and calculated information, the navigation application of some embodiments generates dynamic navigation warnings. FIG. 4 conceptually illustrates a process for generating dynamic navigation warnings. FIG. 4 will be described with reference to FIGS. 5-7. The process 400 of some embodiments is performed by the warning generation module 320 as described above with reference to FIG. 3.

The process 400 receives (at 405) the information collected and calculated as described above in Sections I and II. The process 400 determines (at 410) whether a navigation warning should be provided to the user. In some embodiments, determining whether to provide a navigation warning is based on the collected and calculated information. For example, when the vehicle is already traveling at the safe traveling speed for a particular curve, the navigation application may determine that no navigation warning is necessary. When the process 400 determines (at 410) not to provide a navigation warning, the process 400 returns to step 405.

Figure 5:
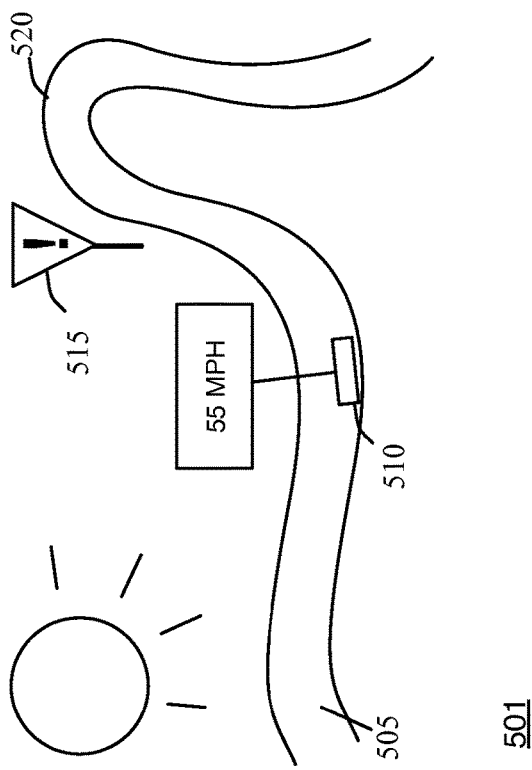
FIG. 5 illustrates different scenarios in which a navigation application determines whether to provide a navigation warning.
Figure 5:
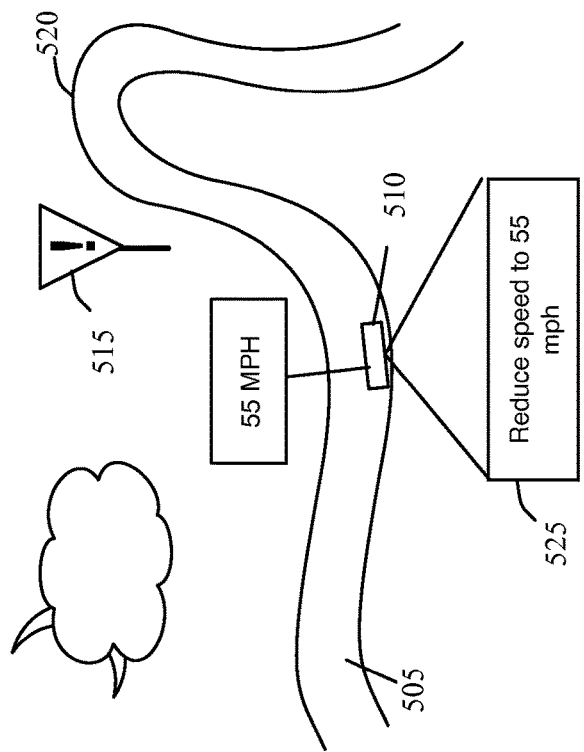
Figure 5:
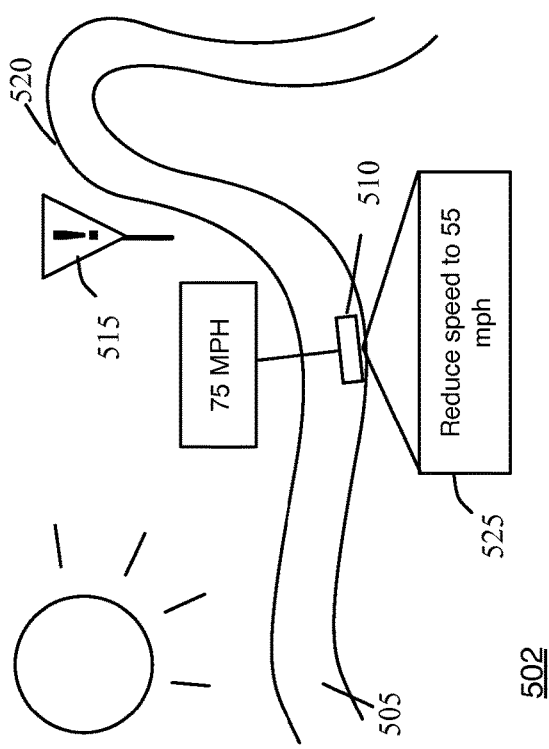
Figure 5:
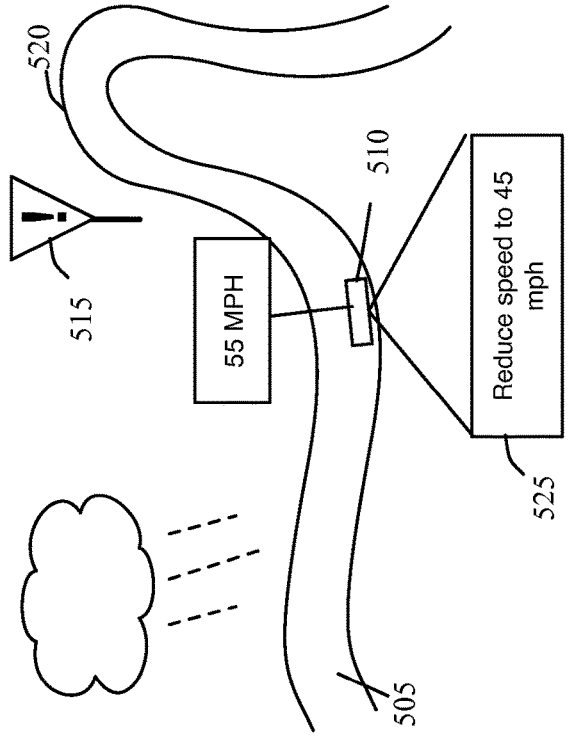

FIG. 5 illustrates different scenarios in which a navigation application determines whether to provide a navigation warning. The navigation application performs the determination based on various types of data that are collected. In the first scenario 501, the vehicle 510 is traveling along the road 505 at 55 mph. The weather is sunny and the roads are dry, so the navigation application determines that 55 mph is a safe speed for the approaching curve 520. In the first scenario 501, the navigation application determines that a navigation warning is not necessary and does not provide a navigation warning for the user.

The second scenario 502 illustrates an example in which the vehicle is speeding along at 75 mph. As the vehicle is traveling at a speed that is beyond a safe threshold for the approaching curve 520, the navigation application determines that a navigation warning is desired and presents a navigation warning 525. The navigation warning 525 advises the user to reduce their speed to 55 mph.

The third scenario 503 illustrates an example in which the road conditions are good, but because it is a cloudy night, visibility is affected. In some embodiments, the navigation application would not normally provide a navigation warning because the user is already traveling at a safe traveling speed with enough time to slow down after seeing the sign 515. However, in this scenario, the navigation application determines that a navigation warning should be provided because the signage 515 regarding the upcoming curve 520 may not be clearly visible due to the dark. The navigation application provides a navigation warning 525, warning the user to reduce their speed to 55 mph.

The fourth scenario 504 illustrates an example in which the navigation application determines whether to provide a navigation warning based on the weather. In some embodiments, the navigation application determines to provide a navigation warning when the instruction for the warning is different than warnings provided by street signs or with the route data. In the example of the fourth scenario 504, the weather is rainy and results in poor road conditions. Based on the weather, as well as the braking and tire condition of the vehicle, the navigation application determines that a safe speed for the upcoming curve 520 is lower than the presented sign 515 and provides a navigation warning 525 with an instruction advising the user to slow down to 45 mph. In addition to determining that a navigation warning should be provided, in the example of stage 504, the navigation instruction for the navigation warning was also modified based on the road conditions. Examples of modifying the navigation instructions for a navigation warning are described below with reference to FIG. 6.

Referring back to FIG. 4, when the process determines (at 410) to provide a navigation warning, the process 400 determines whether to modify (at 415) the navigation warning. The navigation warning may be modified in different ways based on the various collected information.

Figure 6:
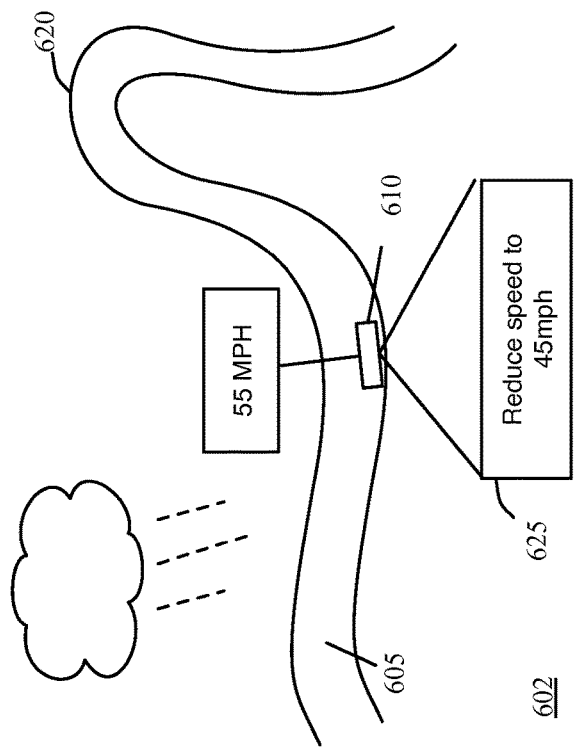
FIG. 6 illustrates different scenarios in which a navigation application modifies different aspects of a navigation warning.
Figure 6:
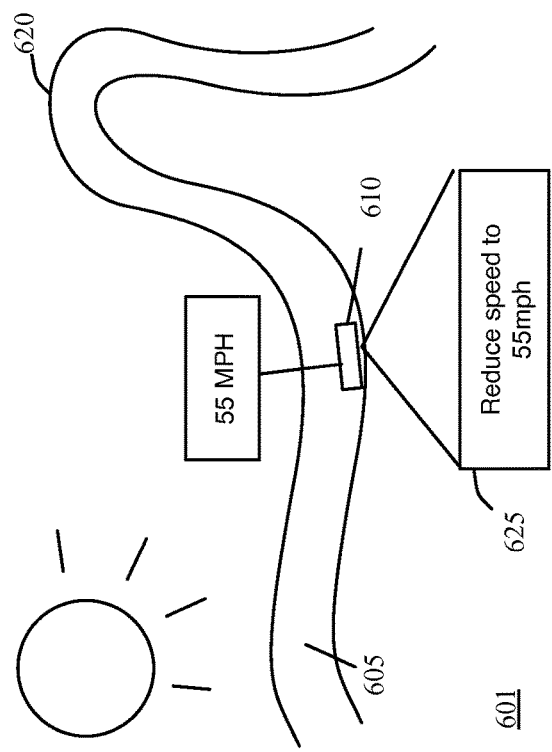
Figure 6:
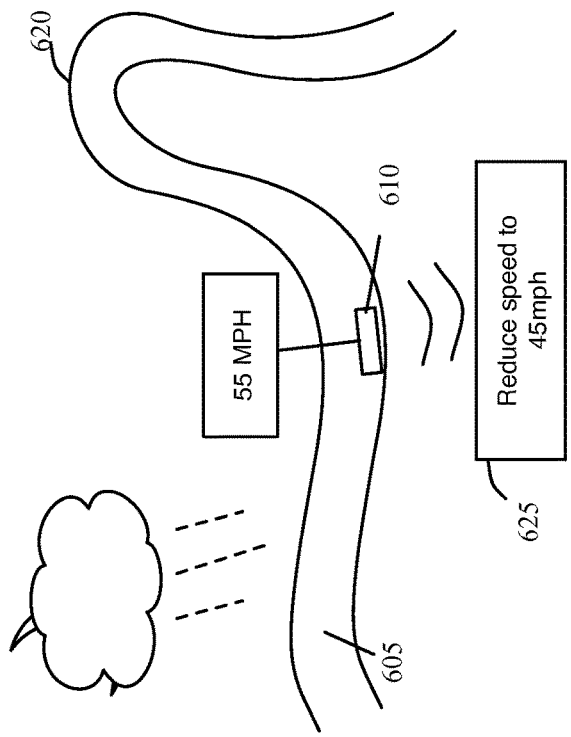

FIG. 6 illustrates different scenarios in which a navigation application modifies different aspects of a navigation warning. In the first scenario 601, the vehicle 610 is traveling along the road 605. A standard navigation warning 625 is provided at a default time or distance prior to the critical point, i.e., curve 620. In the first scenario 601, the navigation instruction of the navigation warning 625 advises the driver to slow down to 55 mph. In some embodiments, this is a default instruction that is received as a part of the route.

In the second scenario 602, unlike the first scenario 601, the weather is poor, indicating possibly slick road conditions. The navigation application calculates a safe traveling speed based on the environmental data and determines that the default instruction to drive at 55 mph is no longer appropriate. The navigation application modifies the navigation instruction of the navigation warning 625, advising the user to slow down to 45 mph, rather than 55 mph. The navigation application of some embodiments modifies the instruction of the navigation warning based on the collected and calculated information to allow a user to travel at a safe speed through the critical points along the route.

As another example of modifying the instruction of a navigation warning, the navigation application of some embodiments modifies the instruction of a navigation warning to advise the user to travel in a particular lane along the route. For example, when a pothole is identified along the route (e.g., through a road hazards database), the navigation application of some embodiments modifies the instruction of a navigation warning to advise a user to travel in a particular lane along the road. In some embodiments, rather than modifying an existing instruction, the navigation application provides a new instruction to direct the user to move to a specified lane.

In the third scenario 603, like the second scenario 602, the weather is poor and the navigation application provides navigation instruction 625. However, in the third scenario 603, the vehicle is traveling at night. The navigation application determines that the weather and the time of day have affected visibility, requiring increased attention to the road. In some embodiments, when the navigation application determines that increased attention is required on the road, the navigation application not only modifies the instruction of the navigation warning (e.g., reducing the recommended speed from 55 mph to 45 mph), but also modifies the way that the warning is provided. For example, in some embodiments, the navigation application provides an audio warning rather than (or in addition to) a warning on the screen of the device, even when the navigation application is not set to provide audio navigation instructions. By modifying the way that the warning is provided, the navigation application is able to emphasize the importance of an upcoming critical point and to provide safer instructions because the user does not have to watch the display screen of the device.

Referring back to FIG. 4, the process 400 then determines (at 425) whether to modify the timing for the navigation warning. As with determining whether to modify the warning instruction at step 415, the process 400 takes the collected and calculated information and determines whether to change the timing for a navigation warning. In some embodiments, the timing for the navigation warning is not modified and is presented at a set time or distance before reaching a critical point. When the process 400 determines (at 425) not to modify the timing for the warning instruction, the process continues to step 435 and provides the navigation warning.

When the process 400 determines (at 425) to modify the timing for the navigation warning, the process modifies (at 430) the timing for the navigation warning. The timing for the navigation warning of some embodiments is modified based on route, vehicle or environmental conditions in order to give the driver enough time to safely decelerate to the safe traveling speed. In some embodiments, the process 400 analyzes the safe traveling speed for a critical point and the time or distance necessary to reach the safe traveling speed in order to calculate a time or distance prior to the critical point at which to provide the navigation warning. As another example, in some embodiments, each navigation warning has a default time or distance before the critical point at which the warning is presented. The process 400 then uses adjustment values to weight the different environmental or vehicle conditions to shorten or lengthen the time or distance before the critical point at which the warning is presented.

Figure 7:
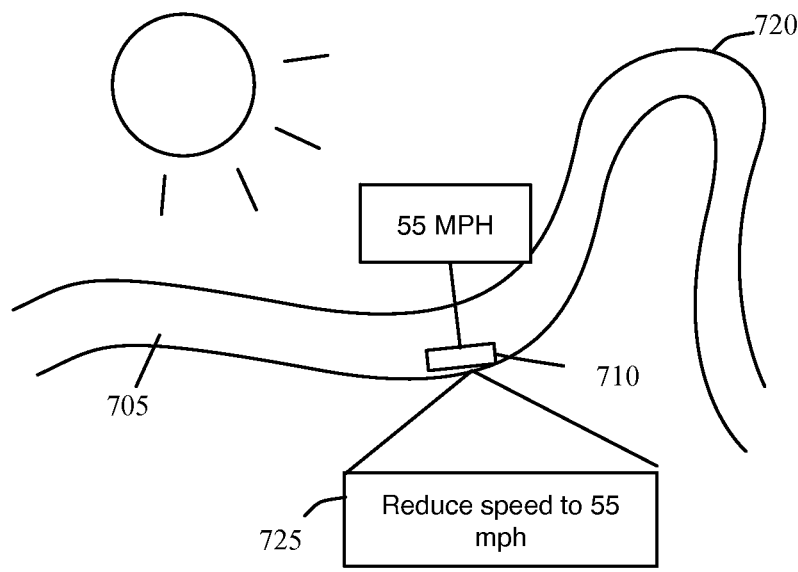
FIG. 7 illustrates an example of modifying the timing for a navigation warning.
Figure 7:
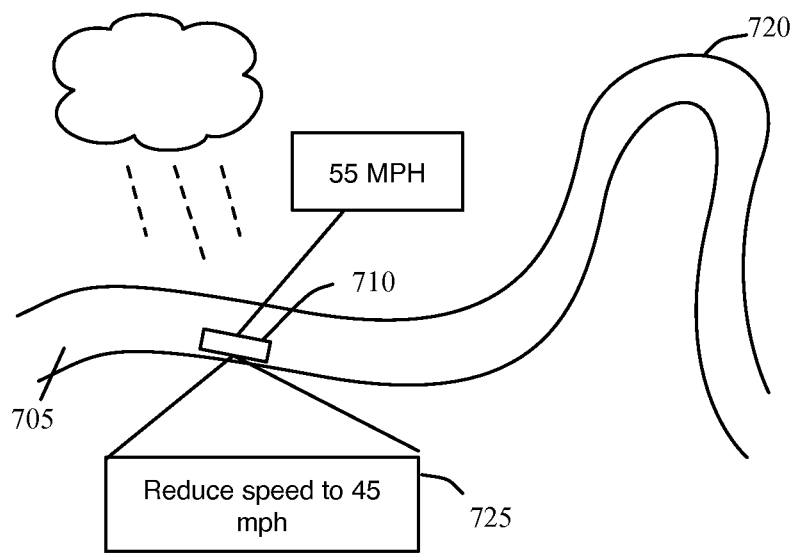

FIG. 7 illustrates an example of modifying the timing for a navigation warning. The first scenario 701 illustrates an example in which, on a sunny day, a first warning 725 is provided for the user. The first warning 725 includes an instruction to reduce the speed to 55 mph. The first warning 725 may be a default warning that is set to display at a particular time or distance before a critical point and is unmodified because the weather and road conditions are good.

The second scenario 702 illustrates an example in which, like the example of scenario 502 of FIG. 5, the instruction for navigation warning 725 is modified to advise the user to reduce speed to 45 mph. However, in this scenario, in addition to modifying the instruction, the navigation warning is provided to the user at an earlier point in time than the warning 725 that is provided in the first scenario 701. In this example, the navigation application determines that the roads may be slick due to the rain, and in addition to identifying a lower safe travel speed, the navigation application also determines that it will take longer to decelerate to the safe traveling speed. The navigation application of some embodiments uses an adjustment value based on the various condition factors to modify the navigation warning to be presented to the user at an earlier time or at a greater distance before the critical point. While in this example, both the instruction and the timing of the navigation warning are modified, in some embodiments, only one or neither of the modifications may be performed on the navigation warning.

The process 400 provides (at 435) the navigation warnings. The navigation warnings of some embodiments are provided on a display screen of a device, through speakers of either the audio device or the vehicle, or a combination of the two, or through any other method of output.

IV. Electronic Device and System

Many of the above-described features and applications are implemented as software processes that are specified as a set of instructions recorded on a computer or machine readable storage medium (also referred to as computer or machine readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
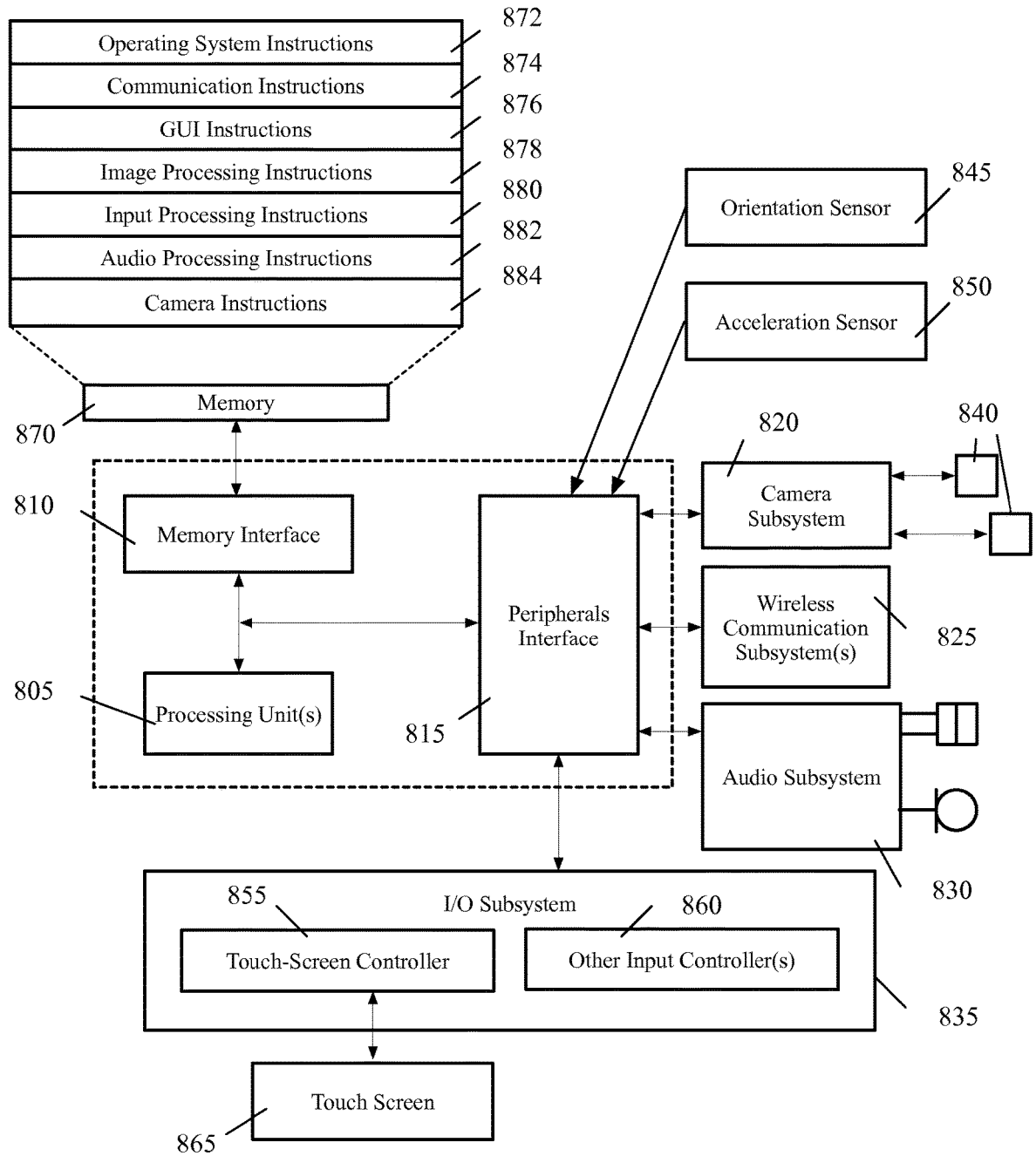
FIG. 8 illustrates an example of an architecture of a mobile computing device.

The mapping and navigation applications of some embodiments operate on mobile devices, such as smart phones (e.g., iPhones®) and tablets (e.g., iPads®). FIG. 8 is an example of an architecture 800 of such a mobile computing device. Examples of mobile computing devices include smartphones, tablets, laptops, etc. As shown, the mobile computing device 800 includes one or more processing units 805, a memory interface 810 and a peripherals interface 815.

The peripherals interface 815 is coupled to various sensors and subsystems, including a camera subsystem 820, a wireless communication subsystem(s) 825, an audio subsystem 830, an I/O subsystem 835, etc. The peripherals interface 815 enables communication between the processing units 805 and various peripherals. For example, an orientation sensor 845 (e.g., a gyroscope) and an acceleration sensor 850 (e.g., an accelerometer) is coupled to the peripherals interface 815 to facilitate orientation and acceleration functions.

The camera subsystem 820 is coupled to one or more optical sensors 840 (e.g., a charged coupled device (CCD) optical sensor, a complementary metal-oxide-semiconductor (CMOS) optical sensor, etc.). The camera subsystem 820 coupled with the optical sensors 840 facilitates camera functions, such as image and/or video data capturing. The wireless communication subsystem 825 serves to facilitate communication functions. In some embodiments, the wireless communication subsystem 825 includes radio frequency receivers and transmitters, and optical receivers and transmitters (not shown in FIG. 8). These receivers and transmitters of some embodiments are implemented to operate over one or more communication networks such as a GSM network, a Wi-Fi network, a Bluetooth network, etc. The audio subsystem 830 is coupled to a speaker to output audio (e.g., to output voice navigation instructions). Additionally, the audio subsystem 830 is coupled to a microphone to facilitate voice-enabled functions, such as voice recognition (e.g., for searching), digital recording, etc.

Conjunctively, or alternatively, some embodiments also include a wired communication subsystem to facilitate communication functions with a vehicle's electronic system. In some embodiments, the wired communication system includes a USB connector for connecting the mobile device to a vehicle electronic system. The interface of some embodiments for communicating with a vehicle electronic system is described in further detail in U.S. Patent Publications 2009/0284476, 2010/0293462, 2011/0145863, 2011/0246891, and 2011/085003, which are incorporated herein by reference.

The I/O subsystem 835 involves the transfer between input/output peripheral devices, such as a display, a touch screen, etc., and the data bus of the processing units 805 through the peripherals interface 815. The I/O subsystem 835 includes a touch-screen controller 855 and other input controllers 860 to facilitate the transfer between input/output peripheral devices and the data bus of the processing units 805. As shown, the touch-screen controller 855 is coupled to a touch screen 865. The touch-screen controller 855 detects contact and movement on the touch screen 865 using any of multiple touch sensitivity technologies. The other input controllers 860 are coupled to other input/control devices, such as one or more buttons. Some embodiments include a near-touch sensitive screen and a corresponding controller that can detect near-touch interactions instead of or in addition to touch interactions.

The memory interface 810 is coupled to memory 870. In some embodiments, the memory 870 includes volatile memory (e.g., high-speed random access memory), non-volatile memory (e.g., flash memory), a combination of volatile and non-volatile memory, and/or any other type of memory. As illustrated in FIG. 8, the memory 870 stores an operating system (OS) 872. The OS 872 includes instructions for handling basic system services and for performing hardware dependent tasks.

The memory 870 also includes communication instructions 874 to facilitate communicating with one or more additional devices; graphical user interface instructions 876 to facilitate graphic user interface processing; image processing instructions 878 to facilitate image-related processing and functions; input processing instructions 880 to facilitate input-related (e.g., touch input) processes and functions; audio processing instructions 882 to facilitate audio-related processes and functions; and camera instructions 884 to facilitate camera-related processes and functions. The instructions described above are merely exemplary and the memory 870 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The machine-readable media may store a program that is executable by at least one processing unit and includes sets of instructions for performing various operations. Examples of programs or code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs), customized ASICs or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 9:
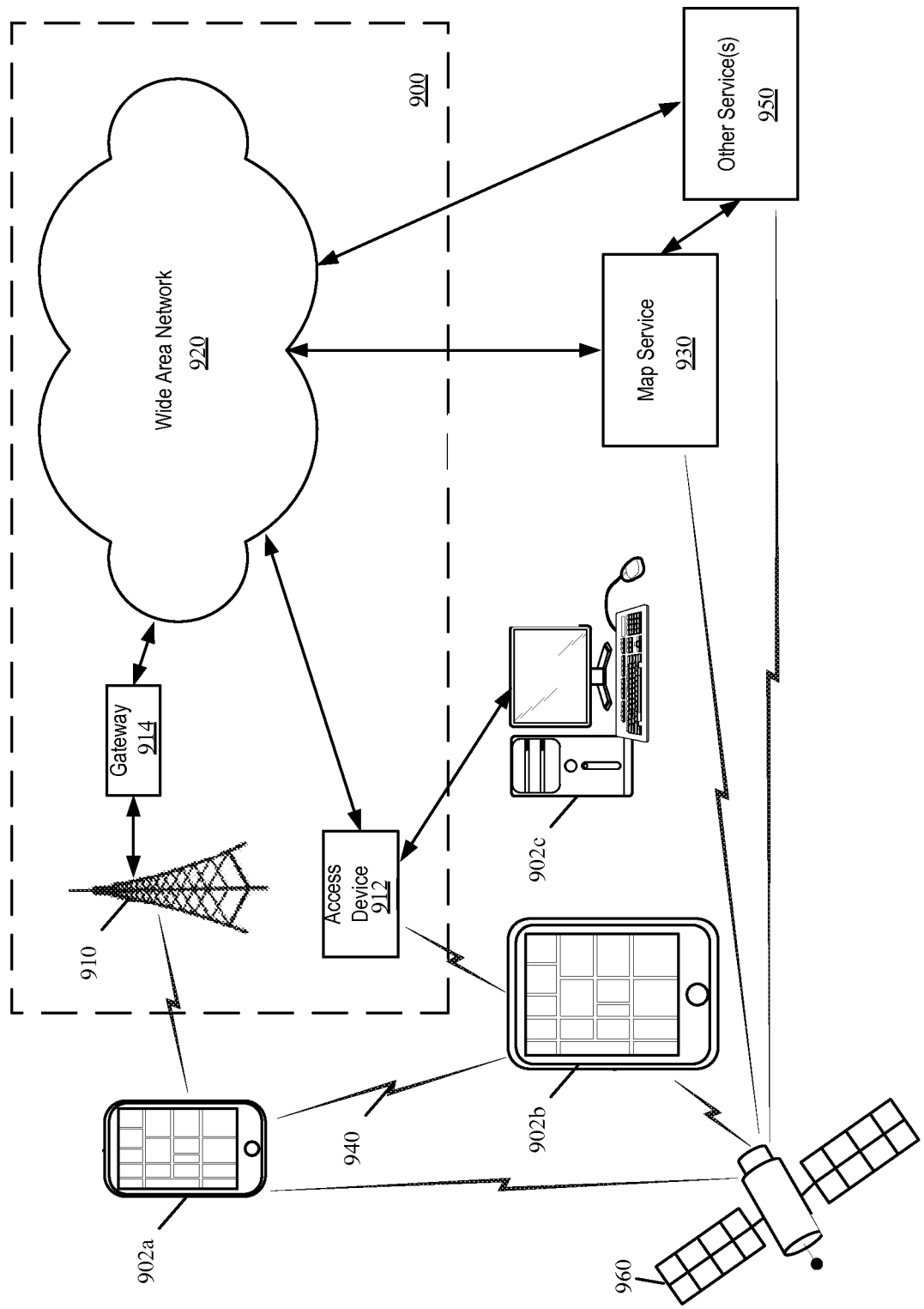
FIG. 9 illustrates a map service operating environment.

As mentioned above, various embodiments may operate within a map service operating environment. FIG. 9 illustrates a map service operating environment, according to some embodiments. A map service 930 (also referred to as mapping service) may provide map services for one or more client devices 902a-902c in communication with the map service 930 through various communication methods and protocols. A map service 930 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 902a-902c may utilize these map services by obtaining map service data. Client devices 902a-902c may implement various techniques to process map service data. Client devices 902a-902c may then provide map services to various entities, including, but not limited to, users, internal software or hardware modules, and/or other systems or devices external to the client devices 902a-902c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 902a-902c) are implemented on different portable-multifunction device types. Client devices 902a-902c utilize map service 930 through various communication methods and protocols. In some embodiments, client devices 902a-902c obtain map service data from map service 930. Client devices 902a-902c request or receive map service data. Client devices 902a-902c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 9 illustrates one possible embodiment of an operating environment 900 for a map service 930 and client devices 902a-902c. In some embodiments, devices 902a, 902b, and 902c communicate over one or more wire or wireless networks 910. For example, wireless network 910, such as a cellular network, can communicate with a wide area network (WAN) 920, such as the Internet, by use of gateway 914. A gateway 914 in some embodiments provides a packet oriented mobile data service, such as General Packet Radio Service (GPRS), or other mobile data service allowing wireless networks to transmit data to other networks, such as wide area network 920. Likewise, access device 912 (e.g., IEEE 802.11g wireless access device) provides communication access to WAN 920. Devices 902a and 902b can be any portable electronic or computing device capable of communicating with a map service. Device 902c can be any non-portable electronic or computing device capable of communicating with a map service.

In some embodiments, both voice and data communications are established over wireless network 910 and access device 912. For instance, device 902a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 910, gateway 914, and WAN 920 (e.g., using Transmission Control Protocol/Internet Protocol (TCP/IP) or User Datagram Protocol (UDP)). Likewise, in some implementations, devices 902b and 902c can place and receive phone calls, send and receive e-mail messages, and retrieve electronic documents over access device 912 and WAN 920. In various embodiments, any of the illustrated client device may communicate with map service 930 and/or other service(s) 950 using a persistent connection established in accordance with one or more security protocols, such as the Secure Sockets Layer (SSL) protocol or the Transport Layer Security (TLS) protocol.

Devices 902a and 902b can also establish communications by other means. For example, wireless device 902a can communicate with other wireless devices (e.g., other devices 902b, cell phones, etc.) over the wireless network 910. Likewise devices 902a and 902b can establish peer-to-peer communications 940 (e.g., a personal area network) by use of one or more communication subsystems, such as Bluetooth® communication from Bluetooth Special Interest Group, Inc. of Kirkland, Wash. Device 902c can also establish peer to peer communications with devices 902a or 902b (not shown). Other communication protocols and topologies can also be implemented. Devices 902a and 902b may also receive Global Positioning Satellite (GPS) signals from GPS satellites 960.

Devices 902a, 902b, and 902c can communicate with map service 930 over the one or more wire and/or wireless networks, 910 or 912. For instance, map service 930 can provide a map service data to rendering devices 902a, 902b, and 902c. Map service 930 may also communicate with other services 950 to obtain data to implement map services. Map service 930 and other services 950 may also receive GPS signals from GPS satellites 960.

In various embodiments, map service 930 and/or other service(s) 950 are configured to process search requests from any of client devices. Search requests may include but are not limited to queries for business, address, residential locations, points of interest, or some combination thereof. Map service 930 and/or other service(s) 950 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 930 and/or other service(s) 950 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 930 and/or other service(s) 950, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 930 and/or other service(s) 950 provide one or more feedback mechanisms to receive feedback from client devices 902a-902c. For instance, client devices may provide feedback on search results to map service 930 and/or other service(s) 950 (e.g., feedback specifying ratings, reviews, temporary or permanent business closures, errors etc.); this feedback may be used to update information about points of interest in order to provide more accurate or more up-to-date search results in the future. In some embodiments, map service 930 and/or other service(s) 950 may provide testing information to the client device (e.g., an A/B test) to determine which search results are best. For instance, at random intervals, the client device may receive and present two search results to a user and allow the user to indicate the best result. The client device may report the test results to map service 930 and/or other service(s) 950 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.).

Also, numerous examples were provided above for using the predicted destinations, predicted routes, or data regarding the predicted destinations or routes to drive the operations of one or more applications. However, one of ordinary skill will realize that such predictions or associated data can be used to inform many other applications not described above. For example, a weather application or a notification manager can use the predicted destination or route information to provide weather at a predicted destination or along a predicted route. Many other examples of informing the operation of many other applications with predicted route, destination or related data exist. Thus, one of ordinary skill in the art would understand that the invention is not to be limited by the foregoing illustrative details, but rather is to be defined by the appended claims.

What is claimed is:

1. A system comprising:
   a display device;
   one or more processing units; and
   a non-transitory machine readable medium storing a program which when executed by at least one processing unit of a mobile device generates a plurality of navigation warnings for a vehicle traveling a route, the program comprising instructions for:
      determining that the vehicle is approaching a critical point along the route; selecting, based on the determination, a navigation warning to present;
      receiving vehicle data and environmental data associated with the vehicle, the environmental data including visibility of street signage;
      when the vehicle data and environmental data indicate a first condition, presenting the navigation warning using a first output method; and
      when the vehicle data and environmental data indicate a second condition, presenting the navigation warning using a second output method.

2. The system of claim 1, wherein the environmental data describes conditions external to the vehicle and the vehicle data describes conditions of the vehicle.

3. The system of claim 2, wherein the instructions for receiving the environmental data comprises instructions for receiving weather data.

4. The system of claim 3, wherein the instructions for receiving the weather data comprises instructions for accessing external sensors of the vehicle.

5. The system of claim 3, wherein the instructions for receiving the weather data comprises instructions for accessing a weather service over a network.

6. The system of claim 2, wherein the navigation warning comprises an instruction to travel in a particular lane along a road.

7. The system of claim 2, wherein the instructions for receiving the environmental data comprises instructions for receiving ambient light data.

8. The system of claim 2, wherein the instructions for receiving the vehicle data comprises instructions for determining a current speed of travel for the vehicle.

9. The system of claim 1, wherein the instructions for presenting the navigation warning comprises instructions for providing a reduced speed at which to travel.

10. The system of claim 1, wherein the data is associated with current road conditions for an upcoming portion of the route, wherein the program further comprises instructions for:
    identifying a designated speed for an upcoming portion of a route; and
    calculating a safe speed at which to travel along the upcoming portion of the route that is different from the designated speed based on the received data, and
    presenting the calculated safe speed.

11. The system of claim 1, wherein the critical point includes one or more of a hazardous curve, a road hazard, and a construction incident along the route.

12. A non-transitory machine readable medium storing a program which, when executed by at least one processing unit of a mobile device, provides a plurality of navigation warnings for a vehicle traveling a route, the mobile device comprising a display screen, the program comprising instructions for:
    determining that the vehicle is approaching a critical point along the route;
    selecting, based on the determination, a navigation warning to present;

receiving vehicle data and environmental data associated with the vehicle, the environmental data regarding visibility of street signage;

when the vehicle data and environmental data indicate a first condition, presenting the navigation warning using a first output method; and when the vehicle data and environmental data indicate a second condition, presenting the navigation warning using a second output method.

13. The non-transitory machine readable medium of claim 12, wherein the environmental data comprises data regarding a location at which street signage becomes visible.

14. The non-transitory machine readable medium of claim 13, the program further comprising instructions for:

calculating a safe braking distance at which the vehicle can safely reduce speed for an upcoming turn; and determining that the warning to be modified when the safe braking distance is greater than a distance between the location at which particular street signage for the upcoming turn becomes visible and the upcoming turn.

15. The non-transitory machine readable medium of claim 14, the program further comprising instructions for determining a timing for providing the instruction based on the safe braking distance.

16. The non-transitory machine readable medium of claim 12, wherein the vehicle data further comprises vehicle data describing conditions of the vehicle, and environmental data describes conditions external to the vehicle.

17. The non-transitory machine readable medium of claim 16, wherein the environmental data comprises weather data.

18. The non-transitory machine readable medium of claim 16, wherein the instructions for receiving the vehicle data comprises instructions for determining a current speed of travel for the vehicle.

19. The non-transitory machine readable medium of claim 12, wherein the plurality of output methods include an audio interface.

20. The non-transitory machine readable medium of claim 12, wherein the plurality of output methods include a visual display.

21. A method implemented by a mobile device for generating navigation warnings for a vehicle traveling a route, the method comprising:

determining that the vehicle is approaching a critical point along the route;

selecting, based on the determination, a navigation warning to present;

receiving vehicle data and environmental data associated with the vehicle, the environmental data including visibility of street signage;

when the vehicle data and environmental data indicate a first condition, presenting the navigation warning using a first output method; and when the vehicle data and environmental data indicate a second condition, presenting the navigation warning using a second output method.

22. The method of claim 21, wherein the environmental data describes conditions external to the vehicle and the vehicle data describes conditions of the vehicle.

23. The method of claim 22, wherein receiving the environmental data further comprises receiving weather data.

24. The method of claim 23, wherein the instructions for receiving the weather data further comprises accessing external sensors of the vehicle.

25. The method of claim 23, wherein the instructions for receiving the weather data further comprises accessing a weather service over a network.

26. The method of claim 22, wherein the navigation warning comprises an instruction to travel in a particular lane along a road.

27. The method of claim 22, wherein receiving the environmental data further comprises instructions for receiving ambient light data.

28. The method of claim 22, wherein receiving the vehicle data comprises determining a current speed of travel for the vehicle.

29. The method of claim 21, further comprising providing a reduced speed at which to travel.

30. The method of claim 21, wherein the data is associated with current road conditions for an upcoming portion of the route, further comprising:

identifying a designated speed for an upcoming portion of a route; and calculating a safe speed at which to travel along the upcoming portion of the route that is different from the designated speed based on the received data; and presenting the calculated safe speed.

* * * * *